March 20, 1962 W. A. NIELSEN 3,026,056
ACCOUNTING APPARATUS
Filed April 6, 1960 2 Sheets-Sheet 1
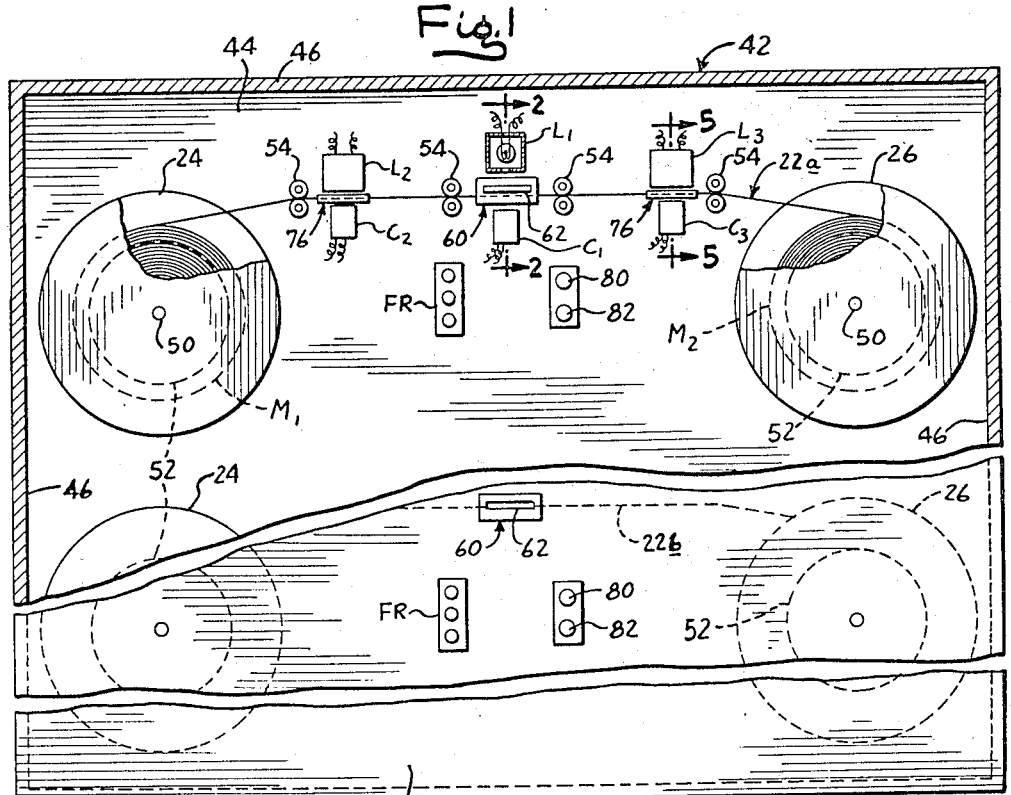
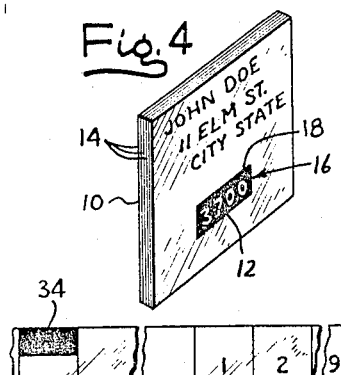
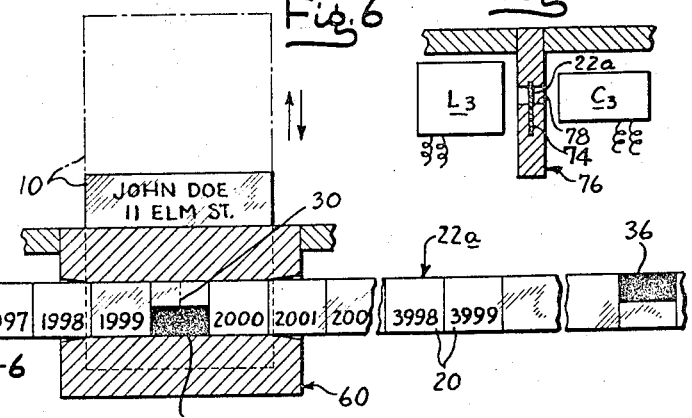
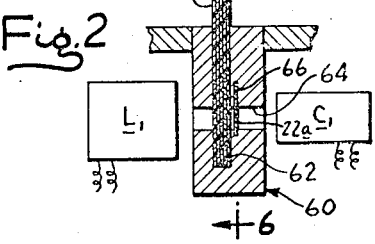
INVENTOR
WATROUS A. NIELSEN
ATTY.

March 20, 1962 W. A. NIELSEN 3,026,056
ACCOUNTING APPARATUS
Filed April 6, 1960 2 Sheets-Sheet 2

INVENTOR
WATROUS A. NIELSEN
by: Norman Gerlach
ATTY.

United States Patent Office 3,026,056
Patented Mar. 20, 1962

3,026,056
ACCOUNTING APPARATUS
Watrous A. Nielsen, 11817 S. Harding Ave.,
Blue Island, Ill.
Filed Apr. 6, 1960, Ser. No. 20,324
4 Claims. (Cl. 242—55.12)

The present invention relates to an accounting system and has particular reference to an apparatus by means of which the system may be carried out. The invention is particularly concerned with a system of identification whereby a card-bearing individual, upon presenting his identification card for processing according to the system, may, by the utilization of the present apparatus receive prompt verification of the authenticity of such card.

The invention will be found particularly useful in connection with credit card identification in department stores and other similar places of business where a card-bearing individual, preparatory to making a credit purchase, must identify himself and, by the presentation of a card or other token, give the sales person the necessary information whereby not only the existence of a charge account but the credit rating of the holder with respect to that account may be ascertained. Such information is usually obtained by telephonic communication with the credit office of the particular establishment concerned while the customer awaits such processing of his credit card. Since, in such instances, all credit records are maintained at a central station, in large department stores having, for example, a hundred or more separate sales departments, during rush periods, seasonal or otherwise, the clerk or clerks in the credit office who are assigned to such credit card processing, are overtaxed, it is not unusual for a customer to encounter a fifteen minute wait or longer before his credit information rating may be cleared, especially if the telephone lines are overburdened. Frequently, failure of a clerk promptly to return a credit rating card to the files before the customer makes a second purchase in a separate department of the establishment, makes it necessary for the customer to make a trip to the credit office before he can make his purchase. While a procedure such as has been outlined above may not be invariably followed by department stores in connection with regular monthly charge accounts where credit cards are accepted by the clerk at face value, it invariably is followed in the case of so-called revolving charge accounts, monthly time payment plans and budget accounts which make up a large percentage of the stores' business.

The present invention is designed to overcome the above-noted limitations that are attendant upon present-day systems of credit card identification, and toward this end, it contemplates the provision of a novel apparatus which, when used according to the system, will enable each department of a department store or similar establishment to have a machine-embodied record of each active valid account, so constituted that by operatively presenting a credit card or token, embodying the principles of the present invention and designed for use in the apparatus, the clerk or other sales person may, by inserting the card in the apparatus for automatic processing thereof, readily ascertain within a matter of a few seconds the authenticity and validity of such credit card with respect to the contemplated purchase.

The invention is, by no means, limited to across-the-counter credit card identification and processing since various other uses are contemplated. Identification cards constructed in accordance with the principles of the present invention, and processing apparatus for such cards will be found useful, for example, in ascertaining club membership for admittance purposes or for bar or restaurant service; for admittance to safety deposit boxes in banks and other similar institutions; for identification in connection with the lending of books in libraries; for hospital plan identification; and for police identification of individuals or for other identification purposes too numerous to mention. The invention may also, with or without modification, be found useful in connection with the issuance of automobile drivers' licenses, police identification thereof, and with car registration data and similar identification thereof. In certain instances, the system and machine of the present invention may be employed entirely apart from the identification of individuals, as, for example, in the classification of objects or materials, scientific data and the like. Irrespective of the particular use to which the present invention may be put, the essential features thereof are at all times preserved.

Briefly, in carrying out the present invention, there is contemplated the provision of a large number of identifying cards, tokens or the like, each of which, in connection with credit card identification as outlined above, may represent an individual charge or credit account. The cards are, in part, transparent and, in part, opaque, each in the preferred form thereof, consisting of a rigid or semi-rigid wallet size, flat, generally rectangular card or token including an opaque identification number or other identifying symbol such as a signature, offset by a transparent background, such indicia occupying a predetermined precise position on the card with respect to the margin thereof. The present apparatus by means of which the various cards or tokens may be processed as outlined above makes provision for the rapid transference of a roll of strip material, preferably photographic film, from one reel to another with the film passing through a sensing station so that a series of indicia, corresponding in pattern to the indicia carried by all of the available outstanding identification or credit cards is successively run through the sensing station. Means are provided whereby at the sensing station, an individual card or token may be introduced for successive register with the film-carried indicia or patterns passing through the station. The indicia on the film is, in effect, a negative of the indicia carried on each identification card, which is to say that if the indicia on the card is opaque with a transparent background, the indicia on the film will be transparent with an opaque background, and vice versa. Additionally, at the sensing station, there is a light-transmitting means for projecting a beam of light through the moving film and through any identification card which may be positioned at the sensing station for successive registry with the film-carried indicia. A light-sensitive electric cell is positioned at the sensing station on the side of the card and film opposite the beam of light and operatively receives the beam or a portion thereof whenever such beam is available. By such an arrangement, the light-sensitive cell will remain energized during passage of the film through the sensing station at all times when mismated indicia are in register at the sensing station. However, when an indicia on the film corresponding to an indicia on a card positioned at the sensing station move into register, the light beam will be momentarily blocked and the cell will become deenergized. Suitable relay-actuated signal means operable under the control of the light-sensitive cell for apprising the operator of the machine of the authenticity or non-authenticity and of the validity or non-validity of the indicia-bearing card, such means preferably consisting of suitable signal lamps capable of selective energization under the control of the cell, are employed.

The provision of an apparatus of the character briefly outlined above being among the principal objects of the invention, it is another object to provide such an apparatus wherein the length of photographic film carried by the machine is fed through the machine continuously and at a rapid rate, as distinguished from intermittent film feeding, while at the same time successive and accurate precision register of the various film strip indicia and the indicia on the card are assured at all times.

A still further object of the invention is to provide an apparatus of this character wherein the film strip carried by the machine is normally or initially positioned with its mid-point in operative position at the sensing station for register with a card, together with means whereby the film may be linearly advanced in either direction to cause film run-out at either end of the strip. By such an arrangement, it is possible, in the case of either numerical or alphabetic indicia, to arrange such indicia in a predetermined classified manner on the strip on opposite sides of the mid-point so that the operator may advance the film in either direction to ascertain the presence or absence of a given indicia without having to run the entire length of the film through the machine. For example, by arranging account numbers above a predetermined number on one side of the mid-point, and by arranging account numbers below such predetermined number on the other side of the mid-point, such an object may be attained. The disposition of odd and even account numbers on opposite sides of the film-strip mid-point will accomplish the same general purpose.

The provision of an apparatus which is extremely simple in its construction and which may be manufactured at a relatively low cost; one which is comprised of a minimum number of parts, particularly moving parts, and which, therefore, is unlikely to get out of order; one which is smooth and silent in its operation; one which is foolproof in its operation and which, therefore, may be operated by an unskilled person; and one which otherwise is well adapted to perform the services required of it are further desirable features which have been borne in mind in the production and development of the present invention.

Numerous other objects and advantages of the invention, not at this time enumerated, will become more readily apparent as the following description ensues.

In the accompanying two sheets of drawings forming a part of this specification, one illustrative embodiment of the invention has been shown.

In these drawings:

FIG. 1 is a plan view of a card processing apparatus constructed in accordance with the principles of the present invention, certain parts being broken away to more clearly reveal the nature of the invention;

FIG. 2 is an enlarged sectional view taken substantially along the line 2—2 of FIG. 1;

FIG. 4 is a perspective view of an identification token constructed in accordance with the principles of the present invention;

FIG. 5 is a sectional view taken substantially along the line 5—5 of FIG. 2; and FIG. 6 is an enlarged sectional view taken substantially along the line 6—6 of FIG. 1.

Figure 3:
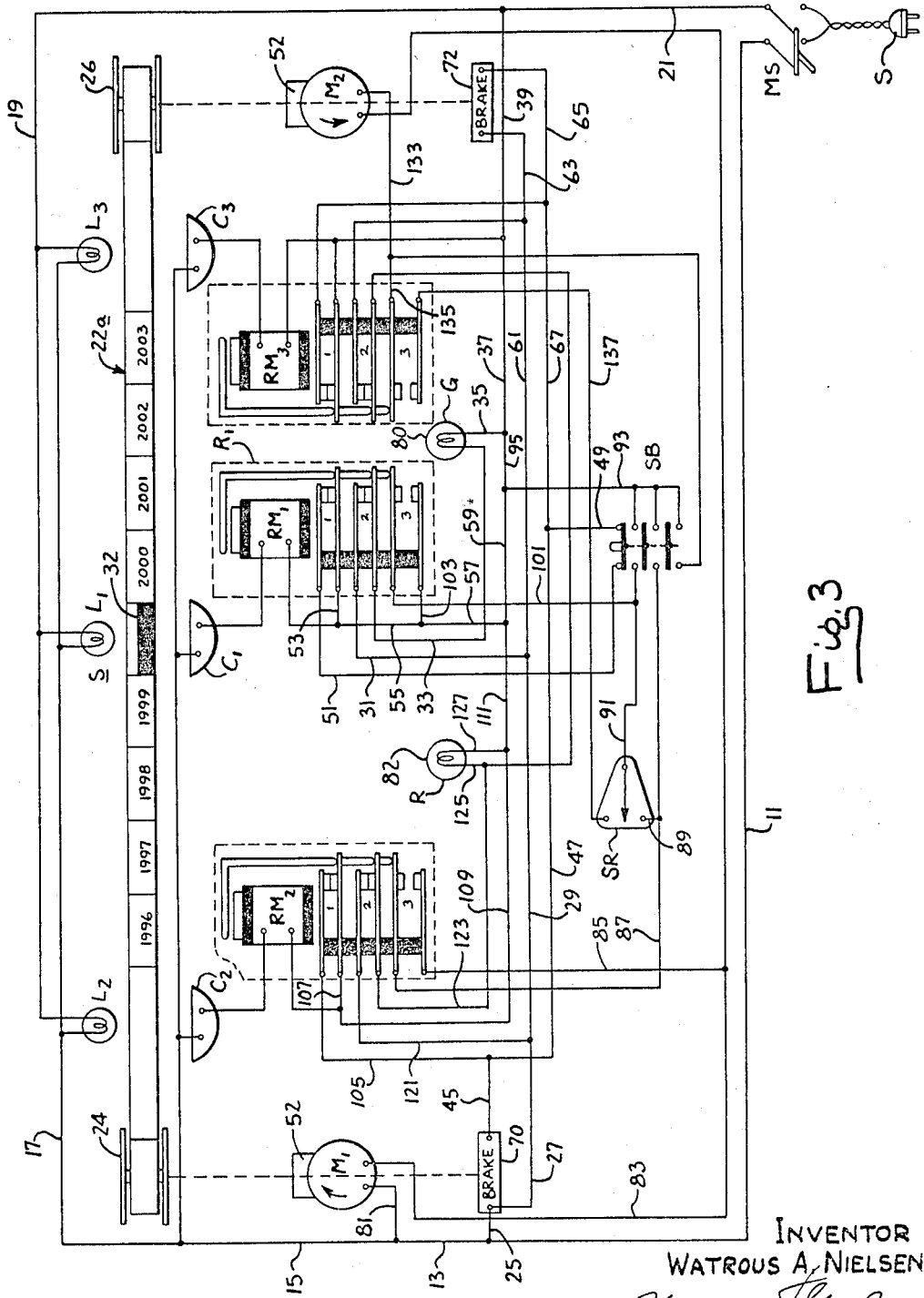
FIG. 3 is a combination schematic view and circuit diagram of the apparatus shown in FIG. 1.

Referring now to the drawings in detail, the invention has, purely for exemplary purposes, been illustrated in connection with the processing of charge accounts in a department store or other similar establishment where the customer having a charge account carries a token in the form of a card assembly such as has been designated in its entirety at 10, such card assembly bearing an indicia 12 for identifying the account, the indicia selected for illustration herein consisting of the numeral "3700." It will be understood that other forms of indicia may be employed on the card as, for example, a letter or series of letters, a signature or print-type letters representing the name of the charge account customer, a symbol or the like.

The card assembly may be of one-piece construction, but preferably, as best seen in FIG. 2, the card is comprised of a plurality of rectangular sheets of a suitable transparent plastic material suitably secured together in coextensive face-to-face contact to provide a composite flat rectangular semi-rigid card structure, the individual sheets 14 being secured together in any suitable manner as by marginal or other heat sealing, or by the use of a suitable solvent or adhesive. Interposed between the outermost lamination or sheet 14 on one side of the card structure and the next adjacent inner lamination and preferably in the central regions of the card structure is a small rectangular strip or frame of photographic film 16, the film emulsion side facing outwardly of the card, which is to say that it is contiguous with the outermost lamination 14 on said one side of the card. The film carries a photographically reproduced representation of the indicia 12, such reproduction being transparent and the remainder of the film being opaque as indicated at 18. The laminated form of film illustrated herein is merely exemplary and it will be understood that, if desired, the film 16 may be interposed between one relatively thick lamination of the transparent plastic and one relatively thin lamination thereof. The use of plural laminations on one side of the film 16 is resorted to merely to provide a card structure which is sufficiently rigid as to conform to the degree of rigidity required in conventional wallet-carried credit identification cards.

For purposes of illustrating the card-processing system of the present invention, it may be assumed that for a given department store or other sales establishment, there are 7,999 charge accounts of the type that require credit card identification of a customer at the time the card is presented to one of the sales personnel in a given sales department. It may be assumed that the various issued credit cards 10 are numbered numerically from 1 to 7,999. If there are in the establishment, 100 sales departments, it is contemplated that at at least one location in each department, there shall be disposed a processing apparatus constructed in accordance with the principles of the present invention, each machine being capable of processing individually all of the issued credit cards 10 by automatic comparison of such card with 7,999 film frames or unit film areas 20 (FIGS. 3 and 6) provided on one or more elongated strips of film material, each of which is transferable between first and second film-carrying reels 24 and 26, respectively.

Although it is possible to provide a single strip of film material with 7,999 film frames so as to accommodate the entire number of outstanding charge accounts for convenience and time-saving in connection with credit card processing, it is desirable that plural film strips 22 be employed as shown in FIG. 1 wherein two such strips are illustrated. These strips have been designated at 22a and 22b, respectively, and it may be assumed that the strip 22a carries film frames representing the account numbers 1 to 3,999, inclusive, the strip 22b carries film frames representing the account numbers 4,000 to 7,999.

The various account-designating indicia on each film strip is preferably divided into two groups extending consecutively along the strip on opposite sides respectively of the film strip mid-point. As shown in FIG. 3, the mid-point of the film strip 22a is designated at 30 and in the left-hand film section extending away from the left-hand end of the strip to the mid-point, the account numbers from 1 to 1,999 are disposed sequentially. In the right-hand section, the account numbers from 2,000 to 3,999 are sequentially disposed. At the mid-point region of the strip 22a, one of the film frames 32 is opaque in nature in the lower region of the frame and serve a purpose that will be made clear presently. Similarly, as shown in FIG. 5, in the opposite end regions of the strip 22a, beyond the first and last film frame of the series, there are provided additional partially opaque film frames 34 and 36, respectively (FIG. 6), these latter opaque frames being opaque in the upper regions of the frame and also serving a purpose that will be subsequently set forth.

The reel 24 is operatively connected in driven relationship to a driving motor M1, while the reel 26 is similarly connected to a driving motor M2, the direction of drive in each instance being indicated by the arrows in FIG. 3. The motor M1 has associated therewith a braking device 70 while the motor M2 associated therewith a braking device 72. The two braking devices are of conventional electrically operated type and are adapted upon energization thereof to effect substantially instantaneous stoppage of the motor with which the same is associated.

Referring now to FIG. 1, the apparatus thus far described, together with additional mechanism subsequently to be described, is adapted to be enclosed in a generally rectangular casing 42 having a bottom wall 44, upstanding side walls 46 and a top wall or cover member 48. The reels 24 and 26 are mounted on spindles 50 supported on the bottom wall which are driven through suitable gear reduction devices 52 from the respective motors M1 and M2. The film strip 22a which extends between the two reels 24 and 26 is guided in its path of travel by suitable pairs of rolls 54. The two pairs of reels shown in FIG. 1, together with the structure associated therewith, are identical in each instance and, therefore, it is believed that a description of the mechanism associated with the uppermost pair of reels 24, 26 will suffice for the others, the only difference being in the placement indicia representing different account numbers on the two film strips 22a and 22b, respectively.

The region midway between the reels 24 and 26 constitutes a sensing station S and at this station there is disposed a receptacle or holder 60 in the form of a box-like structure having a card-receiving slot 62 formed therein. A transverse opening 64 intersects the slot 62 so that when a card such as the card 10 is introduced into the slot, the indicia-carrying film 16 associated therewith moves into register with the opening 64. A photoelectric cell C1, preferably of the photoemissive type, and a light source L1 are positioned within the casing 42 on opposite sides of the structure 60 and in horizontal register with the opening 64 so that light issuing from the source L1 may pass through the opening 64 and strike the light sensitive plate associated with the cell to vary the internal resistance of the cell. The structure is also formed with a slot 66 which intersects the opening 64 and the strip of film 22a is adapted to slidingly pass through the slot 66 so that the lower regions of the various film frames associated with the film will successively be brought into register with the opening 64 as the film is passed continuously from one reel to the other in either direction.

From the above description, it will be seen that when the light source L1 is energized and a given card such as the card 10 illustrated herein is manually inserted in the slot 62, a portion of the light beam issuing from the source will at all times pass through the opening 64 and strike the cell C1 except at such time as the portion 32 of the film opaque frame is in register with the opening or at such time as the particular frame on the film 24a corresponding to the account number represented by the film strip 16 is in register with the opening 64. In the latter instance, the opaque account number on the film strip 16 will block a portion of the light beam while the opaque background offered by the frame on the film strip 22a will block the remaining portion of the light beam so that no light will pass through the structure 60 and the cell C1 will become deenergized.

As shown in the circuit diagram of FIG. 3, the motor M1 which drives the reel 24 has associated therewith a braking mechanism 70 while the motor M2 which drives the reel 26 has associated therewith a braking mechanism 72. These braking mechanisms are of conventional design and each is electrically operable so that upon energization thereof a braking action is applied to the drive shaft of the electric motor associated therewith to effect substantial instantaneous stopping of the motor.

Positioned adjacent the reel 24 is a second photoelectric cell and light source combination C2 and L2, respectively, between which the film 22a is adapted to pass and, similarly, positioned adjacent the reel 26 is a third cell and light source combination C3 and L3, respectively. The film 22a in passing between these latter cells and their associated light sources also passes through slots 74 (FIG. 5) provided in guide members 76. Transverse openings 78 are formed in the guide members and register with the upper region of the film 22a passing through the slots so that when the opaque portion of the film frame 36 near the left-hand end of the film as viewed in FIGS. 3 and 6 moves across one opening 78, the beam of light issuing from the cell C2 will become blocked and the cell will become deenergized, and so that when the opaque portion of the frame 36 near the right-hand end of the film moves across the other opening 78, the beam issuing from the cell C3 will become blocked to deenergize the cell C3.

The purpose of the partially opaque film frame 32 is to provide a means for initially bringing the film strip 22a to a starting position wherein the mid point of the strip is in register with the sensing cell C1 and light source L1 at the sensing station preparatory to processing an identification card 10. Toward this end, the motors M1 and M2 are selectively energizeable under the control of a reversing switch SR so that the strip may be run backwards from either terminal position thereof until such time as the opaque portion 32 of the film strip is sensed by the cell C1, at which time means are provided for applying the braking devices 70 and 72 to instantaneously stop the rotation of the motor shafts, and consequently, the linear travel of the film strip 22a.

Similarly, during processing of any given card with the film strip 22 moving in either direction, near the end of the travel of the strip as the same is nearly unwound from one of the reels 24 or 26, as the case may be, and nearly fully wound from the other reel, one or the other of the opaque portions 34 or 36 will register with and be sensed by one of the cells C2 or C3 and brake application will be effected to terminate the linear travel of the film strip 22a.

Referring now in detail to the circuit diagram of FIG. 3, in the processing of a given card 10, for example, the card illustrated in FIG. 4 wherein the account number "3700" is represented, such card is inserted within the slot 62 of the holder 60 so that the indicia "3700" thereon is in horizontal register with the light source or lamp L1 and cell C1. Assuming that the opaque portion 32 of the film strip 22a to also be in register with the cell C1, upon closure of the master switch MS, a circuit will be completed from the source S, through leads 11, 13, 15, 17, lamps L2, L1 and L3 arranged in a parallel bank, and leads 19, 21, back to the source. The lamps L1, L2 and L3 will thus become energized but, since no light may pass through the opaque portion 32 of the film, the cell C1, which is of the photoconductive type, will have a high ohmic value and no current will flow through the relay magnet RM1 of the relay R1 so that the #1 and #2 contacts of the magnet will remain in their normally closed condition, while the #3 contacts will remain in their normally open condition.

It is to be noted at this point that due to the difference in the horizontal level of the opaque portions of the film in the mid-region thereof and at the end regions thereof, the region 32 will not affect the operation of the photoelectric cells C2 and C3 in passing. Due to the action of the braking mechanisms 70 and 72, the opaque portions 34 and 36 will not encounter the cell C1.

In the operation of the apparatus, as best seen in FIG. 3, upon closure of the main switch MS, a circuit will be completed from the source S through leads 11, 13, 15, 17, the various lamps L1, L2, L3 which are arranged in electrical parallel, and leads 19, 21, back to the source. Assuming now that the film is in its normal or mid-position with the opaque region 32 in register with the cell C1 and lamp L1, the cells C2 and C3 will remain conductive while the cell C1 will remain non-conductive. Accordingly, the #1 and #2 contacts of the magnet RM1 will remain in their normally closed condition while the #3 contacts will remain in their normally open condition. As will be made clear presently, the #1 contacts control the operation of both brake devices 70 and 72. The #2 contacts control the energization of a colored signal lamp 80 which preferably is green in color and which is intended to indicate the starting condition of any given card processing operation, as well as to indicate the authenticity and validity of the card. The #3 contacts control the operation of both motors M1 and M2. Similarly, the #1 contacts of the magnet RM1 control the operation of both brakes; the #2 contacts control the energization of a signal lamp 82 (preferably red); while the #3 contacts control the operation of only the motor M1. Likewise, the #1 contacts of the magnet RM3 control the operation of both brakes; the #2 contacts control the energization of the lamp 82; while the #3 contacts control the operation of only the motor M2.

At the time of closure of the switch MS the cells C2 and C3 are in register with a transparent portion of the film strip 22a so the contacts of both the magnets RM2 and RM3 will be reversed from their normal condition and both motors M1 and M2 will remain deenergized so that there will be no travel of the film strip in either direction. Since the #2 contacts of the magnet RM1 are closed, a circuit will exist from the source, through leads 11, 25, 27, 29, 31, #2 contacts of RM1, leads 33, lamp 80, and leads 35, 37, 39, 21 to the source. The green light 80 will thus be illuminated to signify machine readiness. At the same time a circuit will exist from the source through leads 11, 25, brake 70, leads 45, 47, 49, #1 contacts of start button SB, lead 51, #1 contacts of RM1, leads 53, 55, 57, 59, 37, 39, 21 to the source. At the same time, a parallel circuit from the source through leads 11, 25, 27, 29, 61, 63, brake 72, leads 65, 67, 49, #1 contacts of the start button SB, leads 51, #1 contacts of magnet RM1, leads 53, 55, 57, 59, 37, 39, 21 to the source will exit. Thus, both brakes 70 and 72 will be energized.

Assume now that a customer presents his card 10 bearing indicia representing the account number "3700." The sales person introduces this card into the slot 62 of the receptacle 60 and, noting that the account number is larger or higher than the numeral "1999," places the movable member of the motor switching or film reversing switch FR in the dotted line position thereof, and finally depresses the start button SB. Upon depression of the button SB, a circuit will be completed through the motor M1 so as to cause the film strip 22a to move to the left as seen in FIG. 3. This circuit extends from the source S through leads 11, 13, 81, motor M1, leads 83, 85, #3 contacts of RM2, leads 87, 89, film reversing switch FR, lead 91, button SB, and leads 93, 95, 37, 39, 41, 21 to the source. Energization of the motor M causes the film strip to move the opaque portion 32 out of register with the cell C1 whereupon the #3 contacts of the magnet RM3 become closed and a shunt circuit extends around the #1 contact of the button SB to maintain the motor M1 in operation after the opaque portion 32 is no longer in register with the cell C1. This local circuit extends from the start button SB through leads 101, #3 contacts of C1, and leads 103, 57, 59, 93 back to the start button SB. Initial actuation of the start button SB opens the #1 contacts thereof to release the brakes 70 and 72 by opening of the previously described brake circuits so that the motor M1 is free to run.

The film strip 22a will continue to move to the left as viewed in FIG. 3 until such time as the indicia 12 representing account number 3700 moves into register with the cell C1 at which time, due to the presence of a precise negative of the film indicia on the card 10, the passage of light from the lamp L to the cell C1 will be blocked so that the three pairs of contacts of the magnet RM1 will again be reversed and assume their normal condition. Opening of the #3 contacts will deenergize the motor M1. Closure of the #1 contacts will apply a brake to both motors M1 and M2 to stop the film. Closure of the #2 contacts will cause the green lamp 80 to become illuminated, such illumination causing the operator to be apprised of both the authenticity and validity of the account number, the circuit for the lamp 80 having previously been described.

In the event that the account number is invalid or has been adjudged unsatisfactory, the negative representation of such account number will previously have been withdrawn from the film strip by removal and splicing of the tape by chemically obliterating the same or by otherwise rending the film frame containing the appropriate indicia incapable of blocking the passage of light through the opening 64 so that as the portion of the strip passes the cell C1 the latter will fail to become deenergized and the strip will continue to run until such time as the opaque portion 34 thereon near the end thereof moves into register with the cell C2. At such time, the cell will become ineffective to pass current and the relay magnet RM2 will become deenergized, thus closing the #1 and #2 contacts and opening the # contacts thereof. Closure of the #1 contacts will cause application of both brakes 70 and 72 by energization of a first circuit extending from the source through leads 11, 25, brake 70, leads 45, 105, #1 contacts of RM2, leads 107, 109, 111, 59, 95, 37, 39, 21 to the source; and a second circuit extending from the source through leads 11, 25, 27, 29, 61, 63, brake 72, leads 65, 67, 105, #1 contacts of RM2, leads 107, 109, 111, 59, 95, 37, 39, 41, 21 to the source. Opening of the #3 contacts of the magnet RM2 will open the previously described circuit for the motor M1 through the #3 contacts thereof. Closure of the #2 contacts of the magnet RM2 will energize the signal lamp 82, the circuit for the lamp extending from the source through leads 11, 25, 27, 121, #2 contacts, leads 123, 125, lamp 82, leads 127, 111, 59, 37, 39, 21 to the source.

At this point in the operation of the apparatus, the film will remain stationary with the red lamp 82 indicating that the account number of the presented card is invalid or non-existent.

To return the apparatus to its initial position after such processing of an identification card 10, it is merely necessary for the operator to move the film reversing switch from its dotted line position to the other operative position thereof whereupon the circuit for the motor M2 will be energized. This circuit extends from the source S through leads 131, motor M2, leads 133, 135, #3 contacts of RM3, lead 137, switch FR, leads 91, 101, #3 contacts of RM1 (now closed due to a transparent section of film being in register with cell C1), leads 103, 57, 59, 95, 37, 39, 21 to the source. The motor M2 will return the film to its mid-position wherein the opaque section 32 is in register with the cell C1 whereupon the magnet M1 will become deenergized for application of both brakes 70 and 72, illumination of the green lamp 80 and opening of the motor circuit, all in a manner and by circuits previously described.

It is believed unnecessary to describe the circuits through the #1 and #2 contacts of the magnet RM3 since these circuits are identical with the corresponding circuits for the magnet RM2, the #1 contacts controlling energization of the brakes 70 and 72 and the #2 contacts controlling the energization of the red signal lamp 82.

From the above description, it is thought that the nature, operation and many advantages of the herein described card-processing system and apparatus will be understood and that various modifications of the system and apparatus will suggest themselves, as well as other uses for the same other than those outlined above. It will be understood that in the case of establishments such as clubs, safety deposit box rental departments, small libraries and stores and the like where clientele is limited, thus rendering available a limited number of account numbers, signatures or other indicia, the apparatus shown and described herein will be appropriately modified so that one run of the film strip in one direction will suffice to process the identification card. In such an instance, the film need not have the medial opaque portion 32, and in such an event, the opaque portions 34 and 36 will control film stoppage at each end of the film without modification. However, if desired, film run-out may be prevented by means other than the use of opaque regions on the film and associated relay devices. For example, if the film is to be operatively run in one direction only for sensing purposes, film run-out may be prevented by means of suitable cooperating stops, for example, a stop finger on the film or on a moving portion of the apparatus and a fixed limit stop on the machine framework. The invention, therefore, is not to be limited to the exact arrangement of parts shown in the accompanying drawings or described in this specification as various changes in the details of construction may be resorted to without departing from the spirit of the invention. The invention, therefore, is to be limited only insofar as it has been pointed out in the accompanying claims.

Having thus described the invention what I claim as new and desire to secure by Letters Patent is:

1. In an apparatus for identifying an opaque indicia on anotherwise transparent flat card, in combination, means establishing a sensing station for the card, means providing a fixed beam of light, means for removably supporting said card at said sensing station so that the indicia thereon intercepts a portion of said beam, a first reel mounted for rotation about an axis, a second reel mounted for rotation about an axis, an elongated pattern strip having its ends connected to said reels respectively and convolutely wound on the first reel, said pattern strip being adapted for transfer to the second reel by a winding operation upon rotation of the latter reel in one direction, a motor for driving said reel in said direction, said pattern strip having formed thereon in linearly spaced relation a series of patterns, said strip during winding thereof on the second reel passing through the sensing station so that the patterns thereon move successively into register with said beam of light and intercept portions of the beam, one of said patterns on the strip corresponding in size and shape to the transparent portion of the card at the sensing station whereby, upon movement of the same through the sensing station, the beam of light will, by virtue of the opaque indicia on the card and the opaque portion of said one pattern, be totally intercepted, a light sensitive cell at said sensing station and positioned to receive the unintercepted portions of said beam of light, an electric circuit for said motor, a pair of normally open contacts in said circuit, and relay mechanism operable during application of light to said cell to maintain said normally open contacts closed.

2. In an apparatus for identifying an opaque indicia on an otherwise transparent flat card, the combination set forth in claim 1, including, additionally, a signal circuit including a signal device, a pair of normally closed contacts in said signal circuit, and relay mechanism operable during application of light to said cell for maintaining said pair of normally closed contacts open.

3. In an apparatus for identifying an opaque indicia on an otherwsie transparent flat card, the combination set forth in claim 1, including, additionally, an electrically operable brake for said motor, a circuit for said brake, a pair of normally closed contacts in said brake circuit, and relay mechanism operable during application of light to said cell for maintaining said pair of normally closed contacts open.

4. In an apparatus for identifying an opaque indicia on an otherwise transparent flat card, the combination set forth in claim 1, including, additionally, a signal circuit including a signal device, a pair of normally closed contacts in said latter circuit, an electrically operable brake for said motor, a circuit for said brake, a pair of normally closed contacts in said latter brake circuit, and relay mechanism operable during application of light to said cell for maintaining each of said pairs of normally closed contacts open.

References Cited in the file of this patent

UNITED STATES PATENTS

| | | |
|---|---|---|
| 2,438,588 | Tolson | Mar. 30, 1948 |
| 2,475,315 | Doty | July 5, 1949 |
| 2,482,242 | Brustman | Sept. 20, 1949 |
| 2,781,983 | McGraw | Feb. 19, 1957 |
| 2,827,245 | Kleinschmidt et al. | Mar. 18, 1958 |
| 2,872,590 | Leavens | Feb. 3, 1959 |